United States Patent
Starodubov et al.

[11] Patent Number: 5,903,690
[45] Date of Patent: May 11, 1999

[54] METHOD FOR CHANGING THE REFRACTION INDEX IN GERMANIUM SILICATE GLASS

[75] Inventors: Dmitry S. Starodubov, Los Angeles, Calif.; Evgeny M. Dianov, Moscow; Artem A. Frolov, Kaliningrad, both of Russian Federation

[73] Assignee: D-Star Technologies, Inc., Manhattan Beach, Calif.

[21] Appl. No.: 09/136,145

[22] Filed: Aug. 18, 1998

Related U.S. Application Data

[62] Division of application No. 08/776,933, filed as application No. PCT/RU96/00182, Jul. 5, 1996, Pat. No. 5,838,700.

[51] Int. Cl.$^6$ .............. G02B 6/34; C03B 37/023
[52] U.S. Cl. .............. 385/37; 385/123; 385/128; 385/141; 65/385; 65/392; 65/432
[58] Field of Search .............. 385/37, 123, 124, 385/125, 126, 127, 128, 141, 142, 122; 372/6, 21, 22, 23, 102, 109; 359/333, 334, 341, 345; 65/385, 392, 398, 432

[56] References Cited

U.S. PATENT DOCUMENTS

| | | | |
|---|---|---|---|
| 4,329,385 | 5/1982 | Banks et al. | 428/141 |
| 4,474,427 | 10/1984 | Hill et al. | 385/123 X |
| 4,639,329 | 1/1987 | Makishima et al. | 252/501.1 |
| 4,725,110 | 2/1988 | Glenn et al. | 385/37 X |
| 4,863,821 | 9/1989 | Iino et al. | 430/58 |
| 5,066,133 | 11/1991 | Brienza | 359/570 |
| 5,104,209 | 4/1992 | Hill et al. | 385/27 |
| 5,225,925 | 7/1993 | Grubb et al. | 359/341 |
| 5,237,576 | 8/1993 | DiGiovanni et al. | 372/6 |
| 5,287,427 | 2/1994 | Atkins et al. | 385/124 |
| 5,305,335 | 4/1994 | Ball et al. | 372/6 |
| 5,317,576 | 5/1994 | Leonberger et al. | 372/6 |
| 5,327,515 | 7/1994 | Anderson et al. | 385/123 |
| 5,351,321 | 9/1994 | Snitzer et al. | 385/10 |
| 5,367,588 | 11/1994 | Hill et al. | 385/37 X |
| 5,604,829 | 2/1997 | Bruesselbach | 385/37 |
| 5,620,495 | 4/1997 | Aspell et al. | 65/392 |
| 5,652,818 | 7/1997 | Byron | 385/37 |
| 5,838,700 | 11/1998 | Dianov et al. | 372/6 |

FOREIGN PATENT DOCUMENTS 0 784 217 A1  7/1997  European Pat. Off. ............. 385/37 X

OTHER PUBLICATIONS

Meltz, Morey and Glenn, "Formation Of Bragg Gratings In Optical Fibers By A Transverse Holographic Method", Optics Letters, vol. 14, No. 15, pp. 823–825 (Aug. 1, 1989).

Dianov, Starodubov, Vasiliev, Frolov and Medvedkov, "Near–UV Photosensitivity Of Germanosilicate Glass: Application For Fiber Grating Fabrication," 9th Annual Meeting of IEEE Lasers and Electro–Optics Society, 1996 Annual Meeting (Nov. 1996).

Starodubov, Grubsky, Feinberg, "Bragg Grating Fabrication In Germanosilicate Fibers By Use Of Near–UV Light: A New Pathway For Refractive–Index Changes," Optics Letters, vol. 22, No. 14, pp. 1086–1088 (Jul. 15, 1997).

(List continued on next page.)

*Primary Examiner*—Brian Healy
*Attorney, Agent, or Firm*—Bryan Cave LLP

[57] ABSTRACT

The present invention relates to a method for changing the refractive index in an element comprising germanium silicate glass by irradiating the germanium silicate glass with laser radiation having an associated wavelength in the range of 270 nm to 390 nm for exciting an absorption band in the glass centered at 330 nm. The element may be polymer coated in which instance the glass is irradiated through the polymer coating. In addition, the glass may have been exposed to a hydrogen atmosphere before being irradiated. In either instance, the laser radiation is directed at an angle to the surface of the element or along an optical axis of the element or both. The element may comprise a portion of an optical light guide, such as an optical fiber, or such as an integrated optical waveguide.

10 Claims, 5 Drawing Sheets

OTHER PUBLICATIONS

Dianov, Starodubov, Frolov, Rybaltovskii, "Enhancement Of The Near UV Photosensitivity Of Germanosilicate Glass By Saturation With Hydrogen," Quantum Electronics 26(6), pp. 550–551 (1996).

Dianov and Starodubov, "Microscopic Mechanisms Of Photosensitivity In Germanium–Doped Silica Glass", SPIE Proc. 2777, pp. 60–70 (1995).

Hill, Fujii, Johnson, Kawasaki, "Photosensitivity In Optical Fibre Waveguides: Application To Reflection Filter Fabrication," Appl. Phys. Lett. vol. 32910, pp. 647–649 (1978).

Atkins and Espindola, "Photosensitivity And Grating Writing In Hydrogen Loaded Germanosilicate Core Optical Fibers at 325 and 351 nm", Appl/Phys. Lett. 70(9), pp. 1068–1069 (Mar. 3, 1997).

Kashyap, "Photosensitive Optical Fibers: Devices and Applications", Optical Fiber Technology 1, pp. 17–34 (1994).

Dianov, Kurkov, Medvedkov and Vasiliev, "A New Sensitive Method For Measuring Induced Refractive Index Change In Optical Fiber Core", Photosensitivity and Quadratic Nonlinearity in Glass Waveguides (Fundamentals and Applications), Optical Society of America, 1995 Technical Digest Series, vol. 22 (Sep. 1995).

METHOD FOR CHANGING THE REFRACTION INDEX IN GERMANIUM SILICATE GLASS

CROSS-REFERENCE TO RELATED APPLICATION

This application is a divisional of U.S. patent application Ser. No. 08/776,933 filed Feb. 11, 1997, now U.S. Pat. No. 5,838,700, which is a 371 of PCT/RU96/00182 filed Jul. 5, 1996 entitled "RAMAN FIBER LASER, BRAGG FIBER OPTICAL GRATING, AND METHOD FOR CHANGING THE REFRACTION INDEX IN GERMANIUM SILICATE GLASS" naming Dmitry S. Starodubov, Evgeny M. Dianov, Artem A. Frolov and Alexandr M. Prokhorov as co-inventors.

BACKGROUND OF THE INVENTION

1. Field of the Invention

The present invention relates to methods for changing the refractive index in elements comprising germanium silicate glass, and particularly to such methods in which laser radiation is employed for exciting a particular absorption band in the glass, such as one centered at 330 nm.

2. Description of the Prior Art

A Raman fibre laser is known emitting wavelength $\lambda=1.48$ micron and comprising a fibre light guide based on $SiO_2 + GeO_2$ as the active medium, an ytterbium laser emitting in the wavelength 1.117 micron as the pumping source, and 5 Bragg fibre-optical gratings as the distributed reflectors for wavelengths of 1.175 micron, 1.24 micron, 1.31 micron, 1.40 micron and 1.48 micron that form, respectively, 5 resonators for 1st, 2nd, 3d, 4th and 5th Stokes components of Raman (stimulated combinational) scattering [S. G. Grubb, T. Strasser, W. Y. Cheung, W. A. Reed, V. Mizhari, T. Erdogan, P. J. Lemaire, A. M. Vengsarkar, D. J. DiGiovanni, D. W. Peckham, B. H. Rockhey, "High-Power 1.48 Micron Cascaded Raman Laser in Germanium Silicate Fibres," Optical Amplifiers and Their Appl., Davos, Colo., USA, 15–17 June 1995, p. 197–199].

The drawbacks of this laser is its complexity caused by the necessity to use five pairs of Bragg gratings and a relatively low efficiency of converting the radiation into 5th Stokes component. Furthermore, Bragg gratings do not have a sufficient depth of the refraction index modulation.

A Raman fibre laser emitting wavelength $\lambda=1.48$ micron, comprising a fibre light guide based on $SiO_2+GeO_2$ as the active medium, a solid body laser emitting in the wavelength of about 1 micron as the pumping source, and 6 Bragg fibre-optical gratings as the distributed reflectors for wavelengths of 1.117 micron, 1.175 micron, 1.24 micron, 1.31 micron, 1.40 micron and 1.48 micron that form, respectively, 5 resonators for 1st, 2nd, 3d, 4th, 5th and 6th Stokes components of Raman scattering, is known [S. G. Grubb, T. Strasser, W. Y. Cheung, W. A. Reed, V. Mizhari, T. Erdogan, P. J. Lemaire, A. M. Vengsarkar, D. J. DiGiovanni, D. W. Peckham, B. H. Rockhey, "High-Power 1.48 Micron Cascaded Raman Laser in Germanium Silicate Fibres," Optical Amplifiers and Their Appl., Davos, Colo., USA, 15–17 June 1995, p. 197–199].

The drawbacks of this laser is its complexity caused by the necessity to use six pairs of Bragg gratings, and a relatively low efficiency of converting the radiation into 5th Stokes component. Moreover, Bragg gratings do not have a sufficient depth of the refraction index modulation.

Another known Raman laser, comprises a fibre light guide based on $SiO_2+GeO_2$ as the active medium, a neodymium laser emitting in the wavelength of 1.06 micron as the pumping source, and 3 Bragg fibre-optical gratings as the distributed reflectors for wavelengths of 1.117 micron, 1.175 microns and 1.24 micron that form, respectively, 3 resonators for 1st, 2nd and 3d Stokes components of Raman scattering [S. G. Grubb, T. Erdogan, V. Mizhari, T. Strasser, W. Y. Cheung, W. A. Reed, P. J. Lemaire, A. E. Miller, S. C. Kosinski, G. Nykolak, P. C. Becker, D. W. Peckham, "1.3 Micron Cascaded Raman Amplifier in Germanium Silicate Fibres," Optical Amplifiers and Their Appl., Davos, Colo., USA, 3–5 August 1994, 187–190].

The drawbacks of this laser is its complexity caused by the necessity to use three pairs of Bragg gratings, and a relatively low efficiency of converting the radiation into 3rd Stokes component.

An optical fibre is known that contains phosphorus to reduce the period of erbium ions relaxation and, as the result, the attenuation of the reverse energy transfer from erbium ions to ytterbium ions. [U.S. Pat. No. 5,225,925 dated Jun. 7, 1995. IPC H 01 S 3/16].

The drawback of this fibre is the impossibility to obtain radiation in the wavelengths of 1.24 micron and 1.48 micron owing to the presence of erbium ions in composition of the optical fibre.

A Bragg grating is known that is used as a distributed reflector and implemented in the form of a portion of a fibre light guide, the core refraction index of which light guide having been modulated [U.S. Pat. No. 5,237,576 dated Jul. 8, 1995. IPC H 01 S 3/17].

The drawback of this grating is its low efficiency for the reason that the chemical composition of the optical fibre core is not optimized.

A method is known for changing the refraction index in an optical waveguide of germanium silicate glass, inclusive of the step of acting on a fibre light guide along the optical axis by a laser radiation in the wavelength $\lambda$ approximately 480 nm [K. O. Hill, Y. Fujii, D. C. Johnson and B. S. Kawasaki, "Photosensitivity in optical fibre waveguides: application to reflection filter fabrication," Appl. Phys. Lett. Vol. 32(10), 647–649 (1978)]. Here an argon laser having output power about 1 W and coherence lengthy about L=30 cm in length was used. In this known method the two-photon interaction takes place, i.e. a change in the refraction index was achieved when the absorption band of 240 nm was excited. In a fibre light guide an interference of the incoming and reflected from the face beams occurred, whereby a grating was formed in a light guide.

The drawback of this known method is a slight change of the refraction index $\Delta n(\sim 10)$ and the impossibility to vary the spacing of a grating being formed.

Another known method for changing the refraction index in an optical waveguide of germanium silicate glass includes the step of acting on a fibre light guide at an angle to the waveguide surface by a laser radiation having wavelength approximating 240 nm [G. Meltz, W. W. Morey, W. H. Glenn, "Formation of Bragg gratings in optical fibres by a transverse holographic method," Opt. Lett., Vol. 14 (15), 823–825 (1989)]. In particular, in this known method, a change of the refraction index can be attained by action of radiation of second harmonic of an argon laser ($\lambda=244$ nm), fourth harmonic of a neodymium laser ($\lambda=266$ nm), an excimer laser based on KrF ($\lambda=248$ nm), or a dye laser ($\lambda=240$ nm). In the real practice an excimer laser is commonly used, which is the most unreliable, the most complex and expensive amongst the lasers mentioned above.

Radiation of the second harmonic of an argon laser has a sufficiently great output power (W~0.2 W) and coherent length (L~5 cm), therefore using the same a grating in a fibre light guide is formed by the interference effect directing two beams at angle φ to the light guide surface. However the resulting effective length is not sufficient to form a grating in the case when the radiation is directed along the axis of a fibre light guide due to a high absorption, which is impermissible. Changing angle φ the spacing of the grating being formed can be varied. By a similar method a change of the refraction index can be achieved by action of radiation of fourth harmonic of a neodymium laser (W~1 W), the coherent length of which is L~2–3 cm. Unfortunately, use of this laser is not efficient enough, as the radiation hits the edge of the band of absorption of germanium silicate glass, which is at a maximum of 240 nm. The powerful radiation from an excimer laser (W>2 W) and the second harmonic of a dye laser that hit the center of the band of absorption of germanium silicate glass ensures a sufficiently great change of the refraction index ($\Delta \sim 10^{-3}$). But radiation emitted by these lasers has a little coherent length (L<1 mm), and that makes the use of the interference effect during formation of gratings rather difficult (the gratings are formed using special expensive and non-durable quartz masks, wherethrough the laser radiation is passed).

The main drawback of the aforementioned known method is the use of a too short-wave laser radiation resulting in degradation of the optical elements (that increases as the output power grows) and additional stimulated losses in the optical elements and fibre light guides (in particular, a wide band of absorption of fibre light guides, being 290 nm at most), and this prevents formation of extended and several gratings. Such gratings are not allowed to be passed by polymer claddings of the standard fibre light guides, which makes the formation of gratings therein difficult (the cladding must first be removed from the light guides). Moreover, the laser sources used in the prototype do not provide sufficient reliability.

SUMMARY OF THE INVENTION

The present invention relates to a method for changing the refractive index in an element comprising germanium silicate glass by irradiating the germanium silicate glass with laser radiation having an associated wavelength in the range of 270 nm to 390 nm for exciting an absorption band in the glass centered at 330 nm. The element may be polymer coated in which instance the glass is irradiated through the polymer coating. In addition, the glass may have been exposed to a hydrogen atmosphere before being irradiated. In either instance, the laser radiation is directed at an angle to the surface of the element or along an optical axis of the element or both. The element may comprise a portion of an optical light guide, such as an optical fiber, or such as an integrated optical waveguide.

In a known Raman fibre laser that comprises a fibre light guide based on $SiO_2$ having at least one impurity dopant as the active medium, a laser emitting in the wavelength range from 1.0 to 1.1 micron as the pumping source, the two Bragg gratings as the distributed reflectors for wavelength ranging from 1.20 micron to 1.28 micron that form a resonator, an optical fibre contains P2O5 as the impurity dope, and the $P_2O_5$ distributed reflectors form a resonator for first Stokes component, the optical fibre containing $P_2O_5$ in the amount from 1 to 30 mole %.

In addition, in such a known Raman fibre laser that comprises a fibre light guide based on $SiO_2$ having at least one impurity dopant as the active medium, a laser emitting in the wavelength range from 1.0 micron to 1.1 micron as the pumping source, two Bragg gratings as the distributed reflectors for a wavelength range from 1.20 micron to 1.28 micron, and two Bragg gratings as the distributed reflectors for a wavelength range from 1.46 micron to 1.50 micron forming two resonators, it may be characterized such that an optical fibre contains $P_2O_5$ as the impurity dopant, and the distributed reflectors form resonators for first and second Stokes components, said optical fibre containing $P_2O_5$ in the amount ranging from 1 to 30 mole %.

Particularly, the fibre light guide can additionally contain F, N, Ge, Al, Ti and/or Bi for the purpose to improve its mechanical, optical and other properties as well as for varying the Stokes components wavelength within narrow limits, the additional impurity dopant being contained in the amount ranging from $10^{-4}$ to 10 mole %.

Particularly, the pumping source can be implemented as a neodymium laser, ytterbium laser, semiconductor laser, or a fibre laser. Content of Nd in the active element in a neodymium laser can be in the amount from 0.1 to 2% by weight.

Particularly, the pumping source, comprising a neodymium laser, can additionally comprise a restructuring member based on LiF:F2.

Particularly, the active member of a neodymium laser can be implemented on the basis of yttrium aluminate, lithium fluoride, yttrium-aluminum garnet, gadolinium-gallium garnet, gadolinium-calcium-magnesium-zirconium-gallium garnet or calcium-niobium-gallium garnet.

Particularly, in a fibre laser, length of the fibre light guide can be from 1 to 100 m.

Particularly, length of the fibre light guide can be from 1 to 10 km. Further, the fibre light guide can be implemented as having a step-type refraction index profile. In an alternative version, the fibre light guide core can be implemented as having the refraction index that changes over its cross section.

Particularly, difference between refraction indices of the core and the fibre light guide cladding can be not less than 10.

In addition, in a Bragg fibre grating implemented in the form of a portion of the fibre light guide based on $SiO_2$ having at least one impurity dopant, inclusive of $GeO_2$, the light guide core refraction index may be modulated along its length, content of GeO2 is within the range from 11 to 39 mole %.

Particularly, the fibre light guide of Bragg grating for the purpose of improvement of the optical and mechanical properties can additionally contain F, N, P, Al, Ti and/or Bi as the impurity dopant, content of said additional impurity dopant can be within the range $10^{-6}$ to $10^{-2}$ mole %.

Particularly, length of a portion of the fibre light guide can be within the range from 1 to 100 m.

Particularly, the reflection factor in a Bragg grating in the wavelength range from 1.20 to 1.28 micron can be from 95 to 100%.

Particularly, the reflection factor in a Bragg grating in the wavelength range from 1.20 to 1.28 micron can be from 10 to 80%.

Particularly, the reflection factor in a Bragg grating in the wavelength range from 1.46 to 1.50 micron can be from 95 to 100%.

Particularly, the reflection factor in a Bragg grating in the wavelength range from 1.46 to 1.56 micron can be from 10 to 80%.

In the preferred method for changing the refraction index in germanium silicate glass that comprises the step of acting on a glass by a laser radiation, this action is executed by radiation having wavelength within the range from 270 to 380 nm.

Particularly, a laser radiation can be directed along the optical axis of an element made of germanium silicate glass. In alternative versions, a laser radiation is directed at an angle to the element surface made of germanium silicate glass, or simultaneously along the optical axis and at an angle to the element surface.

Particularly, the element can be implemented as a portion of the fibre light guide, a protection polymer cladding being applied thereon.

Particularly, said element can be implemented in the form of a plate.

Particularly, the action to be done on the glass can be executed by the ultraviolet radiation of an argon laser. In alternative elements, the action to be done on the glass is executed by third harmonic of radiation emitted by a neodymium laser, nitrogen laser, krypton laser or the ultraviolet radiation by a helium-cadmium laser.

BRIEF DESCRIPTION OF THE DRAWINGS

The invention will be described in conjunction with the accompanying drawings.

DETAILED DESCRIPTION OF THE PREFERRED EMBODIMENTS

Figure 1:
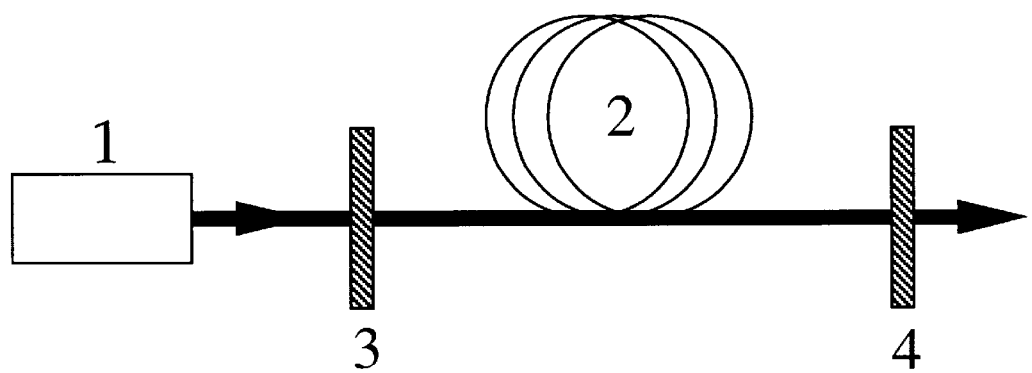
FIGS. 1 and 2 show versions of a Raman fibre laser emitting wavelengths of 1.24 micron and 1.48 micron, respectively.

A Raman laser emitting wavelength of 1.24 micron (FIG. 1) comprises a pumping source 1, a fibre light guide 2, portions of the fibre light guide being Bragg fibre-optical gratings 3 and 4, grating 3 forming a bank distributed reflector of an optical resonator for first Stokes component, and reflector 4 is the output distributed reflector for the same resonator. The type of pumping source 1 and, if feasible, that of its restructuring, and the wavelength of its radiation are selected on the basis of the necessity of fine tuning of a Raman fibre laser radiation wavelength.

Laser (FIG. 1) operates in the following manner. Pumping radiation from the source 1 is converted in the fibre light guide 2 owing to the forced combinational scattering. In the prototype, at the output, third Stokes component was derived; in the laser (FIG. 1) a first Stokes component is derived. Efficiency of conversion into first Stokes component is obviously higher than that into third one, and the conversion itself is simpler. To enhance the efficiency, in the laser (FIG. 1), as in the prototype, the resonance conversion during a multiple passage of the first Stokes component radiation through the resonator formed by reflectors (Bragg gratings) 3 and 4 is used. However, in the prototype, creation of optical resonators not only for the first, but also for the second and third Stokes components is required.

Figure 2:
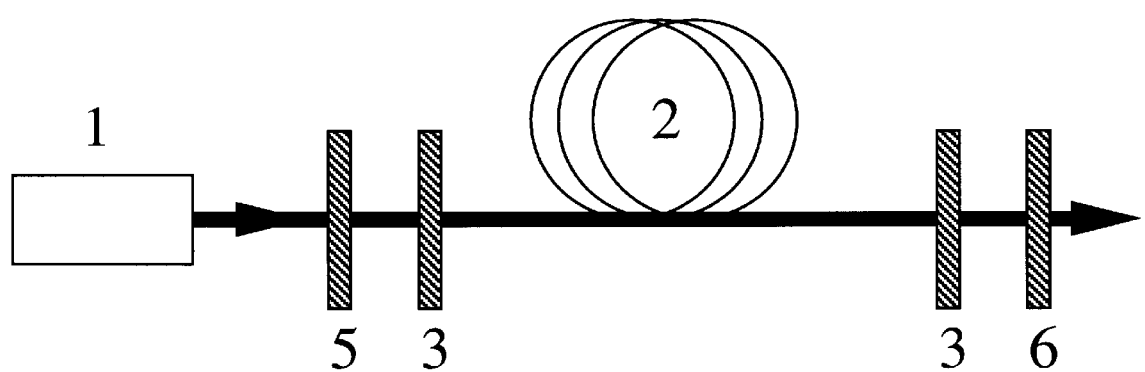

The Raman fibre laser for wavelength of 1.48 micron (FIG. 2) in comparison with the first version (FIG. 1) additionally comprises portions of the fibre waveguide that are Bragg fibre optical gratings 5 and 6, grating 5 forming a bank distributed reflector of the optical resonator for the second Stokes component, and reflector 6—the output distributed reflector for the same resonator. Moreover, there is a second grating 3 instead of grating 4. In this laser (FIG. 2), the second Stokes component is derived, while the most proximate analogue—sixth one. Efficiency of conversion into the second Stokes component is obviously higher than that into the sixth one, and the conversion itself is simpler. The analogue requires creation of optical resonators for first, second, third, fourth, fifth and sixth Stokes components, while in the laser (FIG. 2)—only for the first and second ones.

Figure 3:
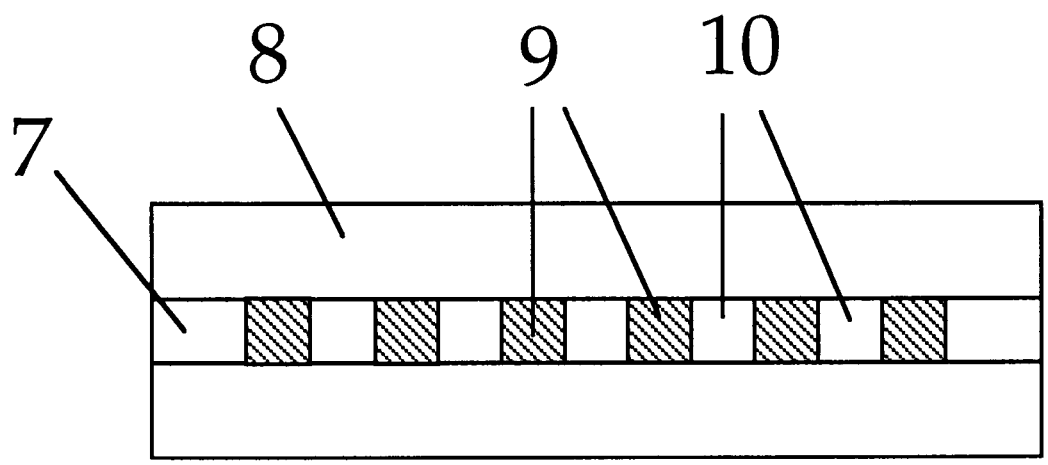
FIG. 3 schematically illustrates a Bragg fibre-optical grating.

The Bragg fibre-optical grating (FIG. 3), as in the prototype, is a portion of the fibre light guide, comprising a core 7 and a cladding 8, in the core sections of a higher 9 and a normal (i.e. a lower than the average value) 10 refraction index are periodically alternated. This grating operates exactly in the same manner as in the prototype. The only distinction is that in the above grating (FIG. 3) a greater difference between the maximum and the minimum values of the refraction index (modulation depth) is provided owing to a new composition of the fibre light guide. Stokes components associated with the dopants were suppressed using an additional long-spacing grating or a special outputting grating introduced into the resonator.

Figure 5:
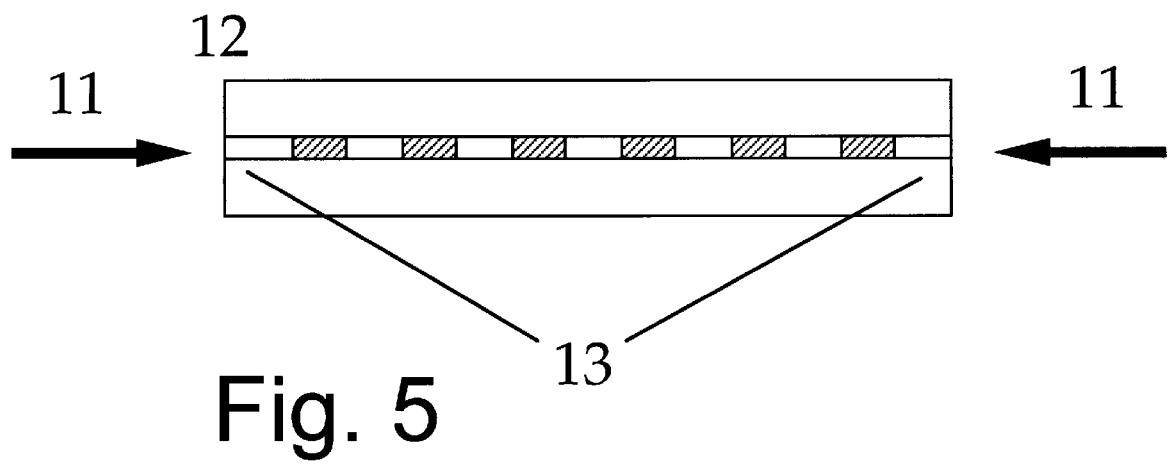
FIGS. 5, 6 and 7 schematically show versions of relative positions of a fibre light guide and a laser radiation beam during formation of a Bragg grating.
Figure 6:
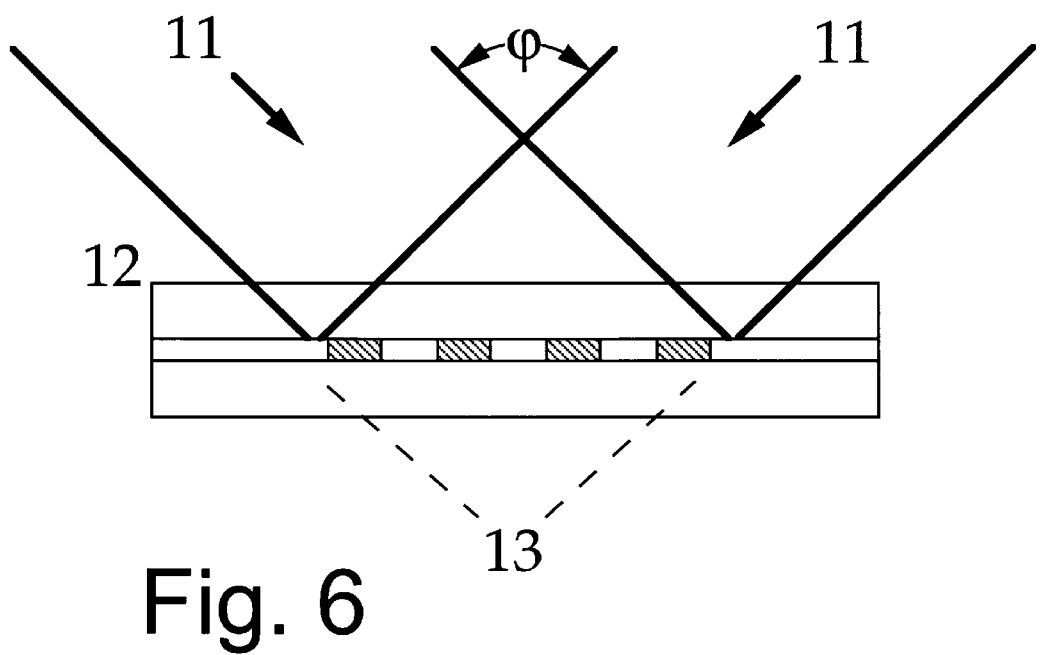
Figure 7:
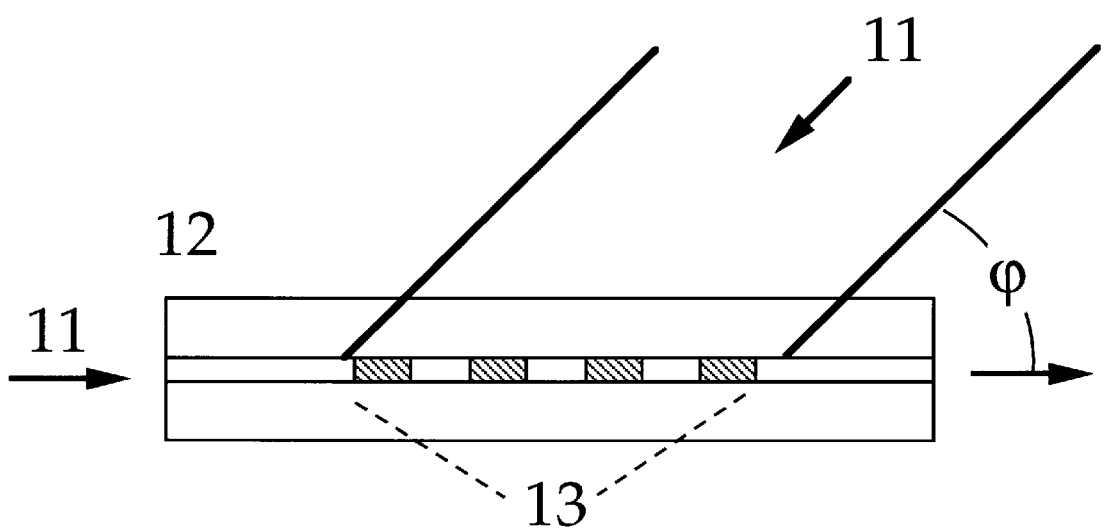

In the course of formation of a Bragg fibre-optical grating in case of the longitudinal geometry (FIG. 5), the laser radiation 11 is directed along the optical axis of the light guide 12; whereas in case of the transverse geometry (FIG. 6), the laser radiation 11 is directed at angle φ to the surface of the light guide 12; and in case of the longitudinal-transverse geometry (FIG. 7), the laser radiation is directed simultaneously along the optical axis of the light guide 12 and at an angle to its surface. FIGS. 5, 6 and 7 show also an area 13 wherein a grating is formed (in FIG. 5 it occupies the entire portion of the fibre light guide 12). The direction of the laser beams 11 in FIGS. 5, 6 and 7 are shown by arrows.

Figure 4:
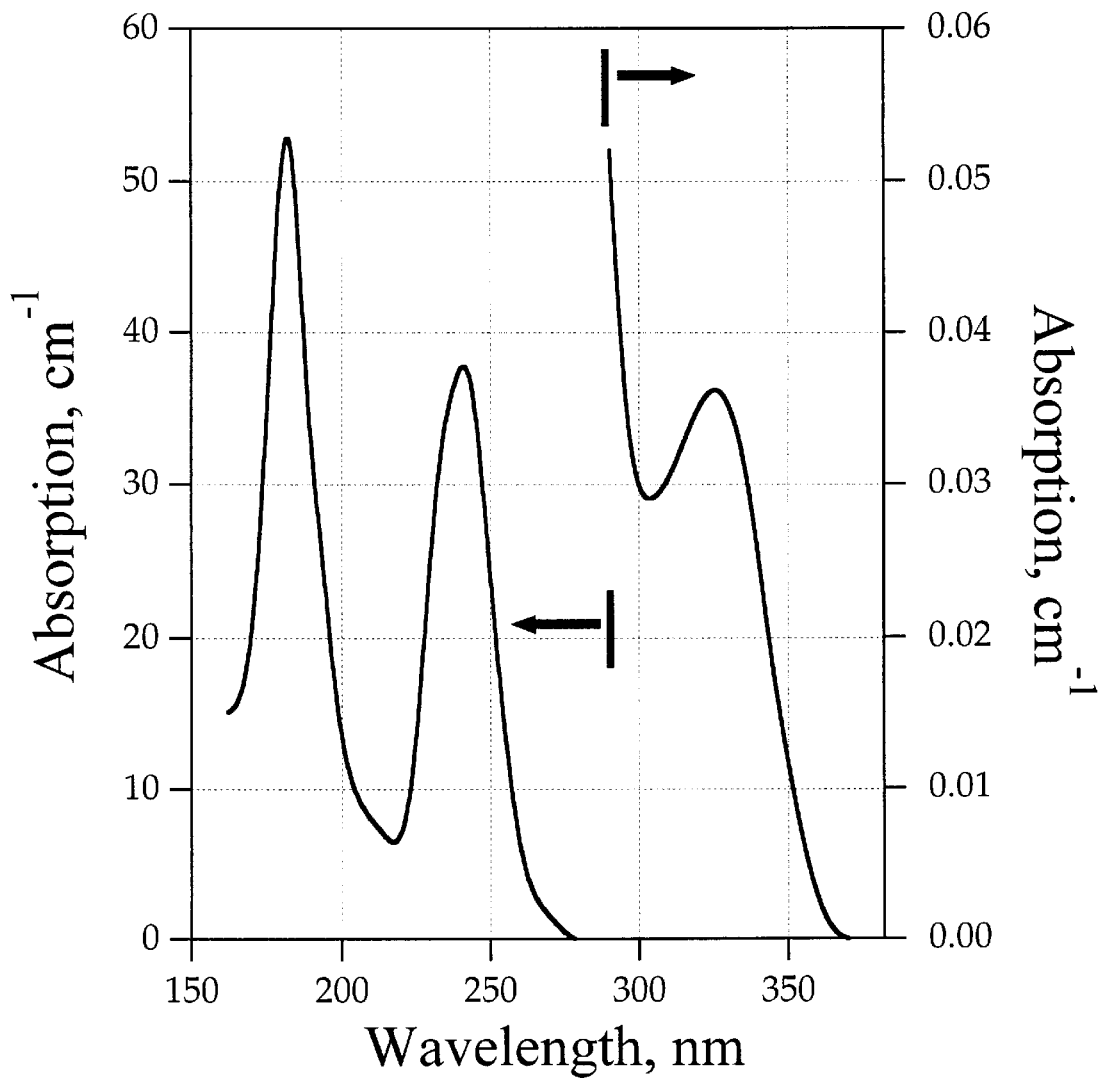
FIG. 4 shows the absorption spectrum that is characteristic of germanium silicate glass.

In accordance with the preferred method of the present invention, experiments have shown that the change of the refraction index of germanium silicate glass required for the industrial applicability can be provided by action of the laser radiation having a wavelength hitting not only the traditionally utilized bands of absorption near wavelengths of 180 and 240 nm, but also a weaker band of absorption having a wavelength approximating 330 nm (FIG. 4). This radiation may be passed through a protection polymer cladding of fibre light guides in accordance with the present invention. For provision of the presently preferred radiation wavelength within the range from 270 to 390 nm for exciting this weaker absorption band, lasers that are more reliable and durable than those of the prototype can be used. Particularly, it is clear that a neodymium laser is a more reliable radiation source, when a third harmonic of its radiation is used (as in the presently preferred method), not the fourth one (as in the prototype). The same is true for an argon laser: in the presently preferred method one of the main lines of radiation is used, while in the prototype—the second harmonic is used.

The experiment has demonstrated that a lesser absorption by germanium silicate glass in the presently preferred range in no way prevents creation of a desired change of the refraction index. Also it was discovered that at the maximum band of absorption near 290 nm, there are no stimulated losses at all. The Slight losses in the presently preferred range allow the formation of gratings not only in the transverse (FIG. 6), but also in the longitudinal (FIG. 5) and the transverse-longitudinal (FIG. 7) geometries. In the longitudinal geometry (FIG. 5), the grating spacing is invariable, and in the transverse geometry (FIG. 6) and the longitudinal-transverse geometry (FIG. 7) it can be varied by changing φ angle.

In comparison with the prototype, a radiation with longer wavelengths (with a lesser energy of photons) used in the presently preferred method does not result in a noticeable degradation of the optical elements.

A known fibre neodymium laser having an output power of 1.5 W, with a 30 m length of fibre light guide and a core of which laser contains 0.5% by weight of Nd, was used as the pumping source 1. Bragg gratings 3, 4 5 and 6 were implemented in the form of portions of the optical fibre 1 m long, the core 7 of which fibre contained 21 mole % of $GeO_2$, and its refraction index having been properly modulated, and the modulation depth reached $8 \times 10^{-4}$. The reflection factor of gratings 3 and 5 at wavelengths of 1.24 micron and 1.48 micron was, respectively, 99%, and the reflection factor of gratings 4 and 6 at waves 1.24 micron and 1.48 micron long was, respectively, 20%. The fibre light guide 2 was 10 m long, and its core contained 19 mole % of $P_2O_5$. The fibre light guide of the neodynium laser 1, the fibre light guide 2 and the fiber light guides of Bragg gratings 3, 4, 5 and 6 had standard transverse dimensions. These light guides were fabricated according to the standard technology using the method of chemical precipitation from gaseous phase [Devyatykh G. G., Dianov E. M., "Fibre Light Guides With Low Optical Losses," USSR Acad. of Sc. Courier, 1981, iss. 10, p. 54–66]. They were welded into an entity.

In carrying out the presently preferred method, one of the following lasers was used: (1) argon laser (ultraviolet radiation with wavelength of 333, 350 and/or 364 nm); (2) neodymium laser based on yttrium-aluminum garnet (third harmonic with wavelength of 355 nm); (3) nitrogen laser (with wavelength of 330 nm); (4) krypton laser (with wavelength of 350 nm); (5) helium-cadmium laser (ultraviolet radiation with wavelength of 330 and/or 350 nm). All these lasers are essentially more reliable and durable than the traditionally used KrF-based excimer one. Provision of sufficient power in the radiation of the second harmonic of an argon laser having a wavelength of 244 nm for the purpose of forming gratings is more difficult than to obtain the radiation of its basic frequency. Similarly, it is more difficult to provide and use the radiation of the fourth harmonic than of its third harmonic. In an apparatus that can carry out the presently preferred method, excimer lasers emitting in the wavelength of 308 nm, 351 nm, 352 nm can be used, but in this case realization of all the benefits of the presently preferred method will not be achieved. Parameters of the lasers which were used and the geometry of the associated experiment are given in the Table below.

In particular, using the presently preferred method, a long-spacing grating in a fibre light guide of germanium silicate glass was created. A fibre light guide was implemented both using the hydrogen atmosphere, and without utilization of a processing by hydrogen. Gratings were formed both by the interference method (FIGS. 5, 6 and 7), and using one focused laser beam ("point-by-point" mode).

Testing of gratings having spacing of 200 micron fabricated utilizing the presently preferred method demonstrated that they are as serviceable as those using the prototype, the refraction index change exceeding $\Delta n \sim 10^{-4}$. Moreover, the additional losses characteristic of the prototype were absent. When the germanium silicate glass obtained in the presence of hydrogen was used, an essential reduction of the stimulated losses was observed.

Testing of Raman fibre lasers (FIGS. 1 and 2) having Bragg gratings (FIG. 3) executed according to the presently preferred method demonstrated that the desired objective is attained when they are used, i.e. simplification of Raman fibre lasers emitting in the wavelength of 1.24 micron and 1.48 micron is provided, and in Raman scattering the efficiency of the radiation conversion increases.

INDUSTRIAL APPLICABILITY

The inventions are industrially applicable in devices for pumping devices in fibre amplifiers of the signals that are used in the broadband fibre-optical communication systems instead of the electronic repeaters. The presently preferred method can also be used for fabricating the fibre and waveguide optics elements made of germanium silicate glass, and in particular, the fibre-optical Bragg and long-spacing gratings, scattering compensators, integrated-optical waveguides, etc.

TABLE

Examples of Specific Embodiments

| Laser | λnm | Mode | W | L | Geometry |
|---|---|---|---|---|---|
| Argon | 333–364 | cont | 5 | 30 | FIGS. 5 and 7 |
| Nd:: Yag (3d harmonic) | 355 | pulse | 3 | 3 | FIG. 6 |
| Nitrogen | 337 | pulse | 0.5 | 0.1 | FIG. 6 |
| He—Cd | 325 | pulse | 0.07 | 50 | FIGS. 5 and 7 |
| Krypton | 338–356 | cont | 1 | 30 | FIGS. 5 and 7 |
| Argon (2nd harmonic) | 244 | cont | 0.2 | 5 | FIG. 6 |
| Nd: Yag (4th harmonic) | 266 | pulse | 1 | 1 | FIG. 6 |
| Excimer KrF | 248 | pulse | 2 | >0.1 | FIG. 6 |
| Excimer XeCl | 308 | pulse | 2 | >0.1 | FIG. 6 |
| Excimer XeF | 352, 352 | pulse | 2 | >0.1 | FIG. 6 |

What is claimed is:

1. A method for changing the refractive index in a polymer-coated element comprising germanium silicate glass, said method comprising the step of irradiating said germanium silicate glass through said polymer coating with laser radiation by exciting an absorption band in said glass centered at 330 nm.

2. A method in accordance with claim 1 wherein said laser radiation has an associated wavelength in the range of 270 nm to 390 nm.

3. A method for changing the refractive index in an element comprising germanium silicate glass, said method comprising the step of irradiating said germanium silicate glass with laser radiation by exciting an absorption band in said glass centered at 330 nm.

4. A method in accordance with claim 3 wherein said laser radiation has an associated wavelength in the range of 270 nm to 390 nm.

5. A method in accordance with claim 3 further comprising the steps of directing said laser radiation at an angle to the surface of said element or along an optical axis of said element or both, said element comprising a portion of an optical light guide.

6. A method in accordance with claim 5 wherein said optical light guide is an optical fiber.

7. A method in accordance with claim 5 wherein said optical light guide is an integrated-optical waveguide.

8. A method for changing the refractive index in an element comprising germanium silicate glass, said method comprising the steps of irradiating said germanium silicate glass with laser radiation having an associated wavelength in the range of 270 nm to 390 nm, said glass having an absorption band exitable by said laser radiation, said irradiating step exciting said absorption band throughout said range, and directing said laser radiation at an angle to the surface of said element or along an optical axis of said element or both.

9. A method in accordance with claim 8 wherein said glass has been exposed to a hydrogen atmosphere, said irradiating step further comprising the step of irradiating said hydrogen exposed glass, said element comprising a portion of an optical fiber light guide.

10. A method in accordance with claim 9 wherein said element comprises a polymer coating surrounding said germanium silicate glass, said method further comprising the step of irradiating said germanium silicate glass through said polymer coating.

* * * * *

UNITED STATES PATENT AND TRADEMARK OFFICE
CERTIFICATE OF CORRECTION

PATENT NO. : 5,903,690
DATED : May 11, 1999
INVENTOR(S) : Dmitry S. STARODUBOV, et al.

It is certified that error appears in the above-identified patent and that said Letters Patent is hereby corrected as shown below:

Column 2, line 49, change "(~10)" to --(~10-6)--.
Column 3, line 32, change "claddings" to --coatings--.
Column 3, line 33-34, change "cladding" to --coating--.
Column 3, line 60, change "P2O5" to --P2O5--, and then change "dope" to --dopant--.
Column 4, line 22, change "LiF:F2" to --LiF:F2--.
Column 4, line 39, change "10." to --10-3--.
Column 4, line 44, change "GeO2" to --GeO2--.
Column 5, line 12, change "cladding" to --coating--.
Column 6, line 47, change "cladding" to --coating--.
Column 6, line 65, change "Slight" to --slight--.
In claim 10, column 10, line 5, change "comprises" to --has--.

Signed and Sealed this

Fourth Day of July, 2000

Attest:

Q. TODD DICKINSON

*Attesting Officer*   *Director of Patents and Trademarks*